United States Patent
Ke

(10) Patent No.: US 11,991,806 B2
(45) Date of Patent: May 21, 2024

(54) EMERGENCY OUTPUT CIRCUIT FOR STARTING LED LAMP TUBES WITH LEAKAGE PROTECTION

(71) Applicant: SHENZHEN BILLDA TECHNOLOGY CO., LTD, Shenzhen (CN)

(72) Inventor: Jianjun Ke, Shenzhen (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 224 days.

(21) Appl. No.: 17/852,319

(22) Filed: Jun. 28, 2022

(65) Prior Publication Data

US 2023/0035285 A1    Feb. 2, 2023

Related U.S. Application Data

(63) Continuation of application No. PCT/CN2021/109565, filed on Jul. 30, 2021.

(30) Foreign Application Priority Data

Jul. 30, 2021    (CN) .......................... 202110870581.4

(51) Int. Cl.
   *H05B 45/50*    (2022.01)
   *H02M 3/337*    (2006.01)
   (Continued)

(52) U.S. Cl.
   CPC ............ *H05B 45/50* (2020.01); *H02M 3/337* (2013.01); *H05B 41/2806* (2013.01);
   (Continued)

(58) Field of Classification Search
   CPC .. H05B 45/50; H05B 41/2806; H05B 45/325; H05B 45/38; H05B 45/39; Y02B 20/30
   See application file for complete search history.

(56) References Cited

U.S. PATENT DOCUMENTS 4,706,177 A * 11/1987 Josephson ............ H02H 7/1227
                                                363/71
4,881,014 A * 11/1989 Okochi ............. H02M 3/33546
                                                315/246

(Continued)

FOREIGN PATENT DOCUMENTS

CN    207677500 U    7/2018
CN    208971208 U    6/2019

*Primary Examiner* — Yusef A Ahmed

(57) ABSTRACT

An emergency output circuit for starting LED lamp tubes with leakage protection includes a PWM pulse genera tor provided with a PWM chip. When a control terminal detects a power outage, a high level of voltage is instantly output to the PWM chip, and the PWM pulse generator outputs complementary drive PWM rectangular waves with a controllable dead time, which are boosted and filtered into a 250V DC voltage; then, positive and negative alternating square waves are formed through a full-bridge inverter circuit, and two pairs of MOS transistors are turned on alternately through complementary PWM control to generate an AC voltage UAB on an LED lamp tube; and finally, an AC rectangular wave slowly changing into a stable 135V AC output from a 250V DC output is obtained through a correction circuit to replace existing methods to turn on the LED tube, thus effectively simplifying the circuit.

7 Claims, 2 Drawing Sheets

(51) Int. Cl.
  *H05B 41/28* (2006.01)
  *H05B 45/325* (2020.01)
  *H05B 45/38* (2020.01)
  *H05B 45/39* (2020.01)

(52) U.S. Cl.
  CPC ........... *H05B 45/325* (2020.01); *H05B 45/38* (2020.01); *H05B 45/39* (2020.01)

(56) References Cited

U.S. PATENT DOCUMENTS

| | | | | |
|---|---|---|---|---|
| 4,999,545 | A * | 3/1991 | Summer | H05B 41/288 315/227 R |
| 8,288,954 | B2 * | 10/2012 | Melanson | H02M 3/33523 315/297 |
| 2005/0111242 | A1 * | 5/2005 | Oh | H02M 3/33507 363/21.07 |
| 2007/0007902 | A1 * | 1/2007 | Lu | H05B 41/2824 315/209 R |
| 2008/0297058 | A1 * | 12/2008 | Soos | H05B 45/382 315/185 R |
| 2010/0164579 | A1 * | 7/2010 | Acatrinei | H02M 1/4208 327/172 |
| 2010/0244726 | A1 * | 9/2010 | Melanson | H05B 45/382 315/291 |
| 2012/0181950 | A1 * | 7/2012 | Yu | H05B 45/327 315/294 |
| 2013/0002162 | A1 * | 1/2013 | Gao | H05B 45/44 315/210 |
| 2013/0214697 | A1 * | 8/2013 | Archenhold | H05B 47/18 315/291 |
| 2017/0201170 | A1 | 7/2017 | Abu-Hajar | |
| 2020/0083813 | A1 * | 3/2020 | Tang | H02M 3/33553 |

* cited by examiner

EMERGENCY OUTPUT CIRCUIT FOR STARTING LED LAMP TUBES WITH LEAKAGE PROTECTION

BACKGROUND OF THE INVENTION

1. Technical Field

The invention relates to the technical field of emergency power circuits, in particular to an emergency output circuit for starting LED lamp tubes with leakage protection.

2. Description of Related Art

Emergency power supplies are used to supply power to various electrical devices required for evacuation lighting or fire-fighting when a fire or other emergency happens to a building. The emergency power supplies are typically composed of a charger, an inverter, a lithium battery, an isolation transformer and a change-over switch and are used for inverting DC voltages into AC voltages. An independent power supply responsible for supplying power to electrical devices to extinguish a fire happening to an industrial or civil building is called an emergency power supply. As explicitly stipulated in Code for Electrical Design of Civil Buildings, level-1 loads shall be supplied with power by two power supplies, so when power supply breaks down, the other power supply will not be damaged; the power supplies for the level-1 loads may be two high-voltage power supplies, one high-voltage power supply and one low-voltage power supply, diesel generator sets or storage battery sets; and in addition to these two power supplies, an emergency power supply shall be added for particularly important level-1 loads.

Most emergency power supplies on the present market output DC voltages, which cannot turn on LED lamp tubes with leakage protection when accessed to the LED lamp tubes. So, in order to turn on the LED lamp tubes with leakage protection, the emergency power supplies have to output DC sine waves, which make the emergency power supplies complicated in design, high in cost and large in size. Thus, a novel output method is urgently needed to solve the problems of the prior art.

BRIEF SUMMARY OF THE INVENTION

The objective of the invention is to overcome the defects of the prior art by providing an emergency output circuit for starting LED lamp tubes with leakage protection. According to the emergency output circuit for starting LED lamp tubes with leakage protection, complementary drive PWM rectangular waves with a controllable dead time are output by a PWM pulse generator and are boosted, rectified and filtered to form a 250V DC voltage; then, alternating square waves are formed on an LED lamp tube through a full-bridge inverter circuit, and two pairs of MOS transistors are turned on alternately by means of complementary PWM control to generate an AC voltage UAB on the LED lamp tube; finally, an AC rectangular wave which slowly changes into a stable 135V AC output from a 250 DC output is obtained through a correction circuit, and the corrected AC rectangular wave can replace existing methods to turn on the LED lamp tube with leakage protection, so that the cost is effectively reduced, and the circuit is simplified.

To fulfill the above objective, the invention provides an emergency output circuit for starting LED lamp tubes with leakage protection, comprising a charging circuit, a push-pull booster circuit provided with a PWM pulse generator, and a full-bridge inverter circuit, wherein the charging circuit is connected to the PWM pulse generator, and the PWM pulse generator comprises a PWM chip; when a control terminal detects a power outage, a high level is instantly output to the PWM chip, and the PWM chip outputs complementary drive PWM rectangular waves with a controllable dead time to the push-pull booster circuit through two output pins; the push-pull booster circuit boosts and rectifies the rectangular waves into a 250V DC voltage and outputs the 250V DC voltage to the full-bridge inverter circuit; and the full-bridge inverter circuit comprises an inverter and a correction circuit, and the 250V DC voltage output by the push-pull booster circuit is processed by the correction circuit in the inverter to output a stable 135V AC voltage.

Specifically, the inverter comprises a first NMOS transistor set and a second NMOS transistor set which are turned on alternately, the first NMOS transistor set comprises a first NMOS transistor and a second NMOS transistor, and the second NMOS transistor set comprises a third NMOS transistor and a fourth NMOS transistor; when the first NMOS transistor set is turned on, a current is output from a positive pole of a 250V DC power supply, passes through the first NMOS transistor to reach a live wire of an LED tube with leakage protection, an internal drive power supply of the LED lamp tube with leakage protection, a null wire of the LED tube with leakage protection, then reaches the second NMOS transistor, and finally returns to a negative pole of the power supply; and when the second NMOS transistor set is turned on, a current is output from the positive pole of the 250 DC power supply, passes through the third NMOS transistor to reach the null wire of the LED lamp tube with leakage protection, the internal drive power supply of the LED lamp tube with leakage protection and the live wire of the LED lamp tube with leakage protection, then reaches the fourth NMOS transistor, and finally returns to the negative pole of the power supply.

Specifically, the correction circuit comprises a first voltage dividing unit, a time compensation unit and an internal operational amplifier chip; and after the 250V AC voltage is divided by the first voltage dividing unit, the time compensation unit is used for time compensation of a first input terminal of the internal operational amplifier chip for processing.

Preferably, the correction circuit further comprises a second voltage dividing unit, and a preset voltage output to the correction circuit is divided by the second voltage dividing unit and is then input to a second input terminal of the internal operational amplifier chip.

Preferably, a first resistor and a first capacitor are connected between an input pin and a compensation pin of the internal operational amplifier chip to be used for loop compensation, and a rectangular wave output by the correction circuit is spread slowly by adjusting parameters of the first resistor and the first capacitor.

Specifically, the push-pull booster circuit comprises a transformer and a full-bridge rectifier circuit, and the PWM rectangular waves with the controllable dead time are boosted by the transformer and are rectified into the 250V DC voltage in the full-bridge rectifier circuit.

Preferably, the push-pull booster circuit further comprises a filter capacitor connected to the full-bridge rectifier circuit in parallel, and the 250V DC voltage is filtered into a smooth 250V DC voltage in the filter capacitor.

Specifically, when the control terminal detects a power outage, a high level is instantly output to a soft-start pin of the PWM chip to slowly increase a voltage of the soft-start pin to 5V.

Specifically, when the control terminal detects a mains supply, a low level is output to the soft-start pin of the PWM chip, and the two output pins of the PWM chip output low levels.

Compared with the prior art, the invention has the following beneficial effects: the emergency output circuit for starting LED lamp tubes with leakage protection comprises a PWM pulse generator, a push-pull booster circuit and a full-bridge inverter circuit, and the PWM pulse generator comprises a PWM chip; when a control terminal detects a power outage, a high level is instantly output to the PWM chip, and the PWM chip outputs complementary drive PWM rectangular waves with a controllable dead time to the push-pull booster circuit through two output pins; the push-pull booster circuit boosts and rectifies the rectangular waves into a smooth 250V DC voltage and outputs the 250V DC voltage to the full-bridge inverter circuit; the full-bridge inverter circuit comprises an inverter and a correction circuit, and the 250V DC voltage output by the push-pull booster circuit is processed by the correction circuit in the inverter to output a stable 135V AC voltage. The complementary drive PWM rectangular waves with the controllable dead time are output by the PWM pulse generator and are boosted, rectified and filtered into the 250V DC voltage; then, alternating square waves are formed on an LED lamp tube through the full-bridge inverter circuit, and two pairs of MOS transistors are turned on alternately through complementary PWM control to generate an AC voltage UAB on the LED lamp tube; and finally, an AC rectangular wave which slowly changes into a stable 135V AC output from a 250V DC output is obtained through the correction circuit, and the corrected rectangular wave can replace existing methods to turn on the LED tube with leakage protection, so that the cost is effectively reduced, and the circuit is simplified.

DETAILED DESCRIPTION OF THE INVENTION

To more clearly explain the invention, the invention will be further described below in conjunction with the accompanying drawings.

Most emergency power supplies on the present market output DC voltages, which cannot turn on LED lamp tubes with leakage protection when accessed to the LED lamp tubes. So, in order to turn on the LED lamp tubes with leakage protection, the emergency power supplies have to output DC sine waves, which make the emergency power supplies complicated in design, high in cost and large in size. Thus, a novel output method is urgently needed to solve the problems of the prior art.

Figure 1:
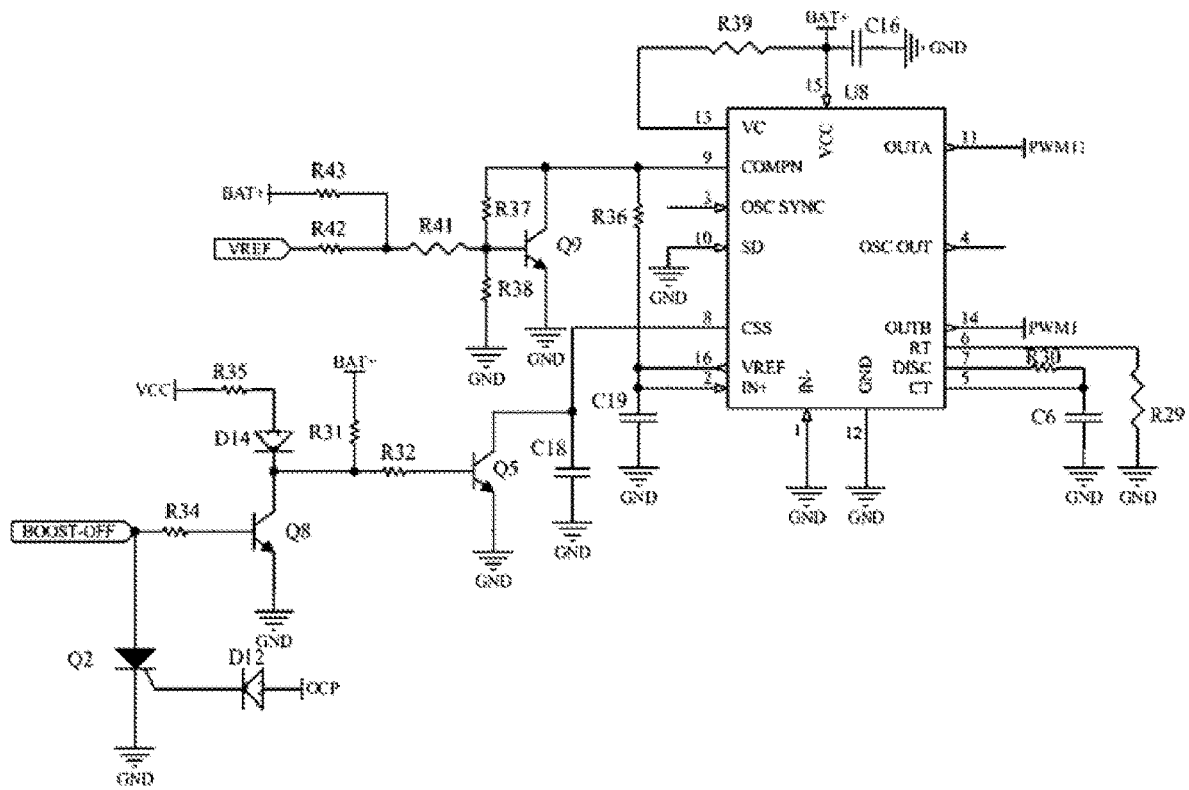
FIG. 1 illustrates a circuit diagram of a pulse generator according to the invention.
Figure 2:
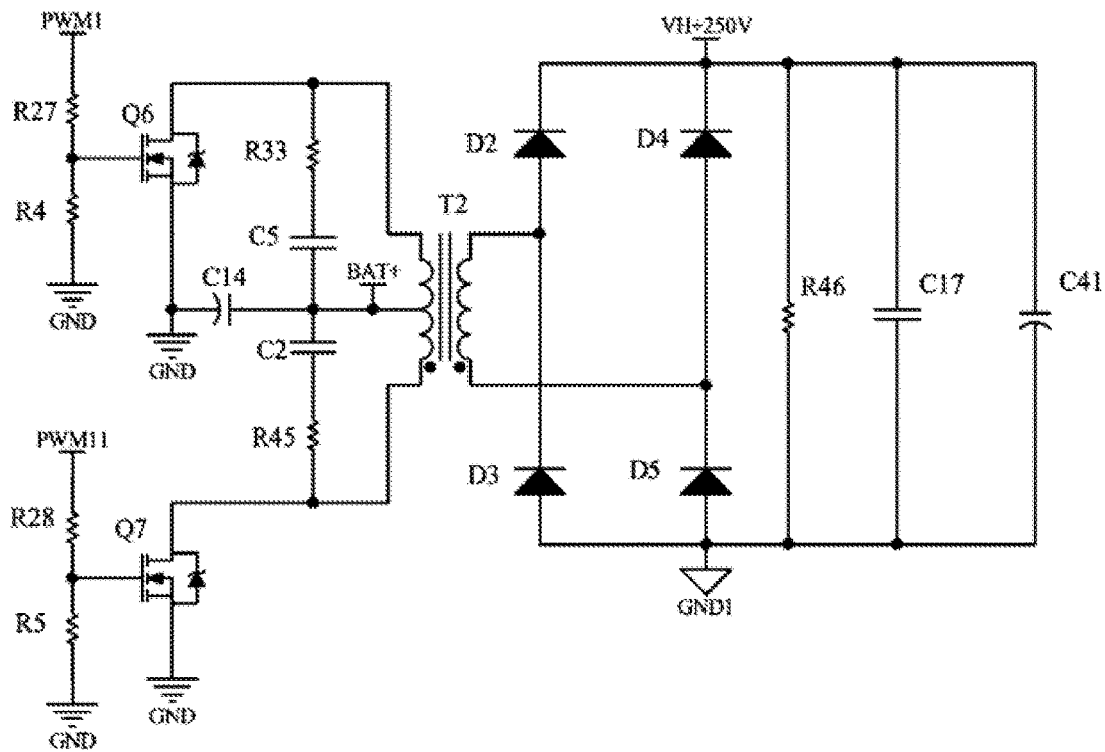
FIG. 2 illustrates a diagram of a push-pull booster circuit according to the invention.
Figure 3:
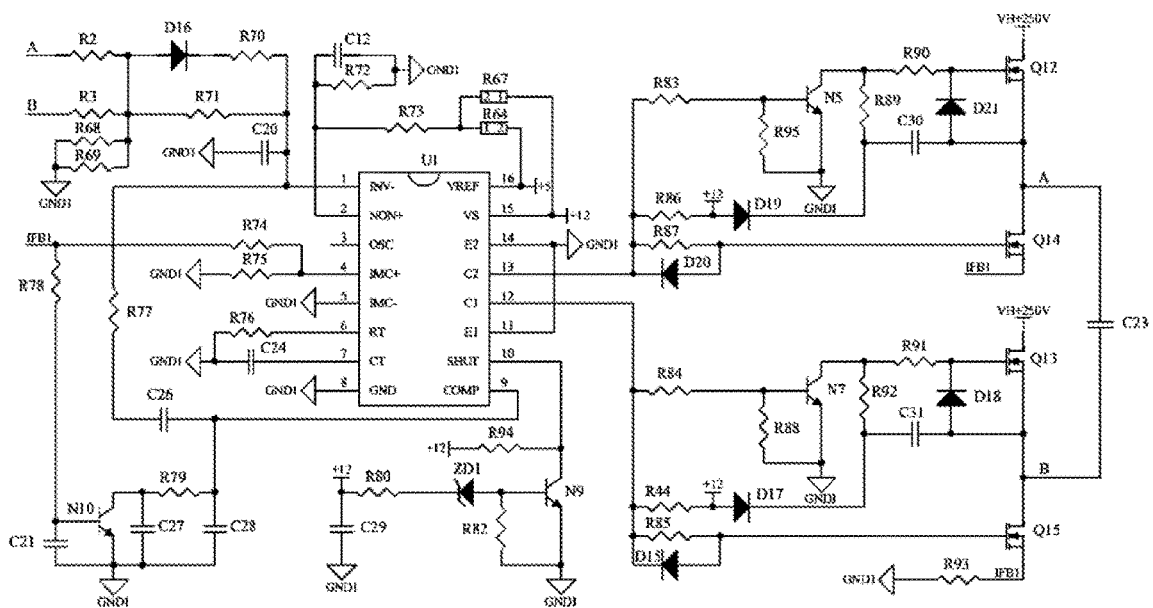
FIG. 3 illustrates a diagram of a full-bridge inverter circuit according to the invention.
Figure 4:
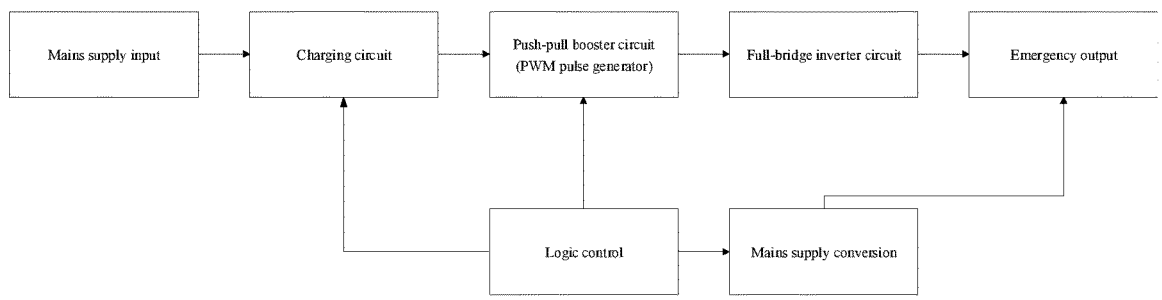
FIG. 4 is a logic diagram of the operating principle of a circuit according to the invention.

To overcome the defects and drawbacks of the prior art, the invention specifically provides an emergency output circuit for starting LED lamp tubes with leakage protection, which, as shown in FIG. 1-FIG. 4, comprises: a charging circuit, a push-pull booster circuit provided with a PWM pulse generator, and a full-bridge inverter circuit, wherein the charging circuit is connected to the PWM pulse generator, and the PWM pulse generator comprises a PWM chip; when a control terminal detects a power outage, a high level is instantly output to the PWM chip, and the PWM chip outputs complementary drive PWM rectangular waves with a controllable dead time to the push-pull booster circuit through two output pins; the push-pull booster circuit boosts and rectifies the rectangular waves into a 250V DC voltage and outputs the 250V DC voltage to the full-bridge inverter circuit; and the full-bridge inverter circuit comprises an inverter and a correction circuit, and the 250V DC voltage output by the push-pull booster circuit is processed by the correction circuit in the inverter to output a stable 135V AC voltage. Most emergency power supplies on the present market output DC voltages, which cannot turn on LED lamp tubes with leakage protection when accessed to the LED lamp tubes, so in order to turn on the lamp tubes with leakage protection, the emergency power supplies have to output AC sine waves. In this solution, the corrected AC rectangular waves UAB output by the emergency output circuit can also meet the requirement for sine wave output. In this embodiment, when the control terminal detects a power outage, a high level is instantly output to a soft-start pin of the PWM chip to slowly increase a voltage of the soft-start pin to 5V. In this embodiment, when the control terminal detects a mains supply, a low level is output to the soft-start pin of the PWM chip, and the two output pins of the PWM chip output low levels. In case of normal mains supply, the charging circuit charges a battery pack BAT+, BOOST-OFF outputs a low level, Q8 is turned off, Q5 is turned on, a pin 8 of the PWM chip outputs a low level, and a pin 11 and a pin 14 of the PWM chip output low levels. When a power outage is detected, BOOST-OFF instantly outputs a high level, Q8 is turned on, Q5 is turned off, the voltage of the pin 8 of the PWM chip is slowly increased to 5V, and the pin 11 and the pin 14 of the PWM chip output complementary drive PWM rectangular waves PWM1 and PWM11 with a controllable dead time.

In this embodiment, the inverter comprises a first NMOS transistor set and a second NMOS transistor set which are turned on alternately, the first NMOS transistor set comprises a first NMOS transistor and a second NMOS transistor, and the second NMOS transistor set comprises a third NMOS transistor and a fourth NMOS transistor; when the first NMOS transistor set is turned on, a current is output from a positive pole of a 250V DC power supply, passes through the first NMOS transistor to reach a live wire of an LED tube with leakage protection, an internal drive power supply of the LED lamp tube with leakage protection and a null wire of the LED tube with leakage protection, then reaches the second NMOS transistor, and finally returns to a negative pole of the power supply; and when the second NMOS transistor set is turned on, a current is output from the positive pole of the 250 DC power supply, passes through the third NMOS transistor to reach the null wire of the LED lamp tube with leakage protection, the internal drive power supply of the LED lamp tube with leakage protection and the live wire of the LED lamp tube with leakage protection, then reaches the fourth NMOS transistor, and finally returns to the negative pole of the power supply. In case of a power outage, after the push-pull booster circuit outputs a stable 250V voltage, a 250V power supply is accessed to the inverter circuit, Q12 and Q15 are turned on, Q13 and Q14 are turned off, a current is output from the positive pole of the DC power supply, passes through Q12, the live wire of the LED lamp tube with leakage protection, the internal drive power supply of the LED lamp tube and the null wire of the LED lamp tube, then reaches Q15, and finally returns to the negative pole of the power supply. When Q12 and Q15 are turned off, Q13 and Q14 are turned on, a current passes through Q13, the null wire of the LED lamp tube with leakage protection, the internal drive power supply of the LED lamp tube and the live wire of the LED lamp tube, then reaches Q14, and finally returns to the negative pole of the power supply. At this moment, alternating square waves are formed on the LED lamp tube, and two pairs of MOS transistors are alternately turned on by means of complementary PWM control to generate an AC voltage UAB on the LED lamp tube.

In this embodiment, the correction circuit comprises a first voltage dividing unit, a time compensation unit and an internal operational amplifier chip; and after the 135V AC voltage is divided by the first voltage dividing unit, the time compensation unit is used for time compensation of a first input terminal of the internal operational amplifier chip for processing. In a preferred embodiment, the correction circuit further comprises a second voltage dividing unit, and a preset voltage input to the correction circuit is divided by the second voltage dividing unit and is then input to a second input terminal of the internal operational amplifier chip.

The approach of emergency output of a corrected wave UAB is as follows:

1. A preset voltage is output, and reaches a pin 2 of the chip U1 after being divided by R64, R67, R73 and R72;

2. After UAB obtains a 250V voltage, the voltage is divided by R2, R68 and R69, D16, R70, R71 and C20 are used for time compensation of the pin 1 of the chip U1, and after being processed by the internal operational amplifier of the chip, a UAB which slowly changes into a stable 135V AC output from a 250 AC output is obtained; and D16, R70, R71 and C20 used for time compensation actually play a role of controlling a corresponding time.

In a preferred embodiment, a first resistor and a first capacitor are connected between an input pin and a compensation pin of the internal operational amplifier chip to be used for loop compensation, and a rectangular wave output by the correction circuit is spread slowly by adjusting parameters of the first resistor and the first capacitor. The pins 1 and 9 of the chip U1, R77 and C26 are used for loop compensation, the parameters of R77 and C26 may be adjusted to slowly spread the rectangular wave output by the UAV to match a present current in the lamp tube with leakage protection, so as to protect users against electric shocks, so that the corrected rectangular wave can turn on the LED lamp tube with leakage protection.

In this embodiment, the push-pull booster comprises a transformer and a full-bridge rectifier circuit, and the PWM rectangular waves with the controllable dead time are boosted by the transformer and are rectified into the 250V DC voltage in the full-bridge rectifier circuit. In a preferred embodiment, the push-pull booster circuit further comprises a filter capacitor connected to the full-bridge rectifier circuit in parallel, and the 250V DC voltage is filtered into a smooth 250V DC voltage in the filter capacitor. In case of a power outage, PWM1 and PWM11 output complementary drive pulses, Q6 and Q7 are turned on alternately, the voltage is boosted by the transformer T2 and is then rectified into a 250V voltage by the full-bridge rectifier circuit composed of D2, D3, D4 and D5, and then the 250V voltage is filtered into a smooth 250V DC voltage by the capacitor C41.

The following invention has the following advantages:

Complementary drive PWM rectangular waves with a controllable dead time are output by the PWM pulse generator and are boosted, rectified and filtered into the 250V DC voltage; then, alternating square waves are formed on an LED lamp tube through the full-bridge inverter circuit, and two pairs of MOS transistors are turned on alternately through complementary PWM control to generate an AC voltage UAB on the LED lamp tube; and finally, an AC rectangular wave which slowly changes into a stable 135V AC output from a 250V DC output is obtained through the correction circuit, and the corrected rectangular wave can replace existing methods to turn on the LED tube with leakage protection, so that the cost is effectively reduced, and the circuit is simplified.

The above embodiments are merely several specific ones of the invention, and the invention is not limited to these specific embodiments. Any variations obtained by those skilled in the art should also fall within the protection scope of the invention.

What is claimed is:

1. An emergency output circuit for starting LED lamp tubes with leakage protection, comprising a charging circuit, a push-pull booster circuit provided with a PWM pulse generator, and a full-bridge inverter circuit, wherein the charging circuit is connected to the PWM pulse generator, and the PWM pulse generator comprises a PWM chip; when a control terminal detects a power outage, a high level of voltage is instantly output to the PWM chip, and the PWM chip outputs complementary drive PWM rectangular waves with a controllable dead time to the push-pull booster circuit through two output pins; the push-pull booster circuit boosts and rectifies the rectangular waves into a 250V DC voltage and outputs the 250V DC voltage to the full-bridge inverter circuit; and the full-bridge inverter circuit comprises an inverter and a correction circuit, and the 250 VDC voltage output by the push-pull booster circuit is processed by the correction circuit in the full-bridge inverter circuit to output a stable 135V AC voltage;

wherein the inverter comprises a first NMOS transistor set and a second NMOS transistor set which are turned on alternately, the first NMOS transistor set comprises a first NMOS transistor and a second NMOS transistor, and the second NMOS transistor set comprises a third NMOS transistor and a fourth NMOS transistor; when the first NMOS transistor set is turned on, a current is output from a positive pole of a 250V DC power supply, passes through the first NMOS transistor to reach a live wire of an LED tube with leakage protection, an internal drive power supply of the LED lamp tube with leakage protection, a null wire of the LED tube with leakage protection, then reaches the second NMOS transistor, and finally returns to a negative pole of the power supply; and when the second NMOS transistor set is turned on, a current is output from the positive pole of the 250 DC power supply, passes through the third NMOS transistor to reach the null wire of the LED lamp tube with leakage protection, the internal drive power supply of the LED lamp tube with leakage protection and the live wire of the LED lamp tube with leakage protection, then reaches the fourth NMOS transistor, and finally returns to the negative pole of the power supply;

wherein the correction circuit comprises a first voltage dividing unit, a time compensation unit and an internal operational amplifier chip; and after the 250V DC voltage is divided by the first voltage dividing unit, the time compensation unit is used for time compensation of a first input terminal of the internal operational amplifier chip for processing; and wherein the correction circuit further comprises a second voltage dividing unit, and a preset voltage output to the correction circuit is divided by the second voltage dividing unit and is then input to a second input terminal of the internal operational amplifier chip.

2. The emergency output circuit for starting LED lamp tubes with leakage protection according to claim 1, wherein a first resistor and a first capacitor are connected between an input pin and a compensation pin of the internal operational amplifier chip to be used for loop compensation, and a rectangular wave output by the correction circuit is spread slowly by adjusting parameters of the first resistor and the first capacitor.

3. The emergency output circuit for starting LED lamp tubes with leakage protection according to claim 1, wherein the push-pull booster circuit comprises a transformer and a full-bridge rectifier circuit, and the PWM rectangular waves with the controllable dead time are boosted by the transformer and are rectified into the 250V DC voltage in the full-bridge rectifier circuit.

4. The emergency output circuit for starting LED lamp tubes with leakage protection according to claim 3, wherein the push-pull booster circuit further comprises a filter capacitor connected to the full-bridge rectifier circuit in parallel, and the 250V DC voltage is filtered into a smooth 250V DC voltage in the filter capacitor.

5. The emergency output circuit for starting LED lamp tubes with leakage protection according to claim 1, wherein when the control terminal detects the power outage, the high level of voltage is instantly output to a soft-start pin of the PWM chip to slowly increase a voltage of the soft-start pin to 5V.

6. The emergency output circuit for starting LED lamp tubes with leakage protection according to claim 1, wherein when the control terminal detects a mains supply, a low level of voltage is output to the soft-start pin of the PWM chip, and the two output pins of the PWM chip output low level of voltage, respectively.

7. An emergency output circuit for starting LED lamp tubes with leakage protection, comprising a charging circuit, a push-pull booster circuit provided with a PWM pulse generator, and a full-bridge inverter circuit, wherein the charging circuit is connected to the PWM pulse generator, and the PWM pulse generator comprises a PWM chip; when a control terminal detects a power outage, a high level of voltage is instantly output to the PWM chip, and the PWM chip outputs complementary drive PWM rectangular waves with a controllable dead time to the push-pull booster circuit through two output pins; the push-pull booster circuit boosts and rectifies the rectangular waves into a 250V DC voltage and outputs the 250V DC voltage to the full-bridge inverter circuit; and the full-bridge inverter circuit comprises an inverter and a correction circuit, and the 250V DC voltage output by the push-pull booster circuit is processed by the correction circuit in the full-bridge inverter circuit to output a stable 135V AC voltage;

wherein the inverter comprises a first NMOS transistor set and a second NMOS transistor set which are turned on alternately, the first NMOS transistor set comprises a first NMOS transistor and a second NMOS transistor, and the second NMOS transistor set comprises a third NMOS transistor and a fourth NMOS transistor; when the first NMOS transistor set is turned on, a current is output from a positive pole of a 250V DC power supply, passes through the first NMOS transistor to reach a live wire of an LED tube with leakage protection, an internal drive power supply of the LED lamp tube with leakage protection, a null wire of the LED tube with leakage protection, then reaches the second NMOS transistor, and finally returns to a negative pole of the power supply; and when the second NMOS transistor set is turned on, a current is output from the positive pole of the 250 DC power supply, passes through the third NMOS transistor to reach the null wire of the LED lamp tube with leakage protection, the internal drive power supply of the LED lamp tube with leakage protection and the live wire of the LED lamp tube with leakage protection, then reaches the fourth NMOS transistor, and finally returns to the negative pole of the power supply;

wherein the correction circuit comprises a first voltage dividing unit, a time compensation unit and an internal operational amplifier chip; and after the 250 VDC voltage is divided by the first voltage dividing unit, the time compensation unit is used for time compensation of a first input terminal of the internal operational amplifier chip for processing; and wherein a first resistor and a first capacitor are connected between an input pin and a compensation pin of the internal operational amplifier chip to be used for loop compensation, and a rectangular wave output by the correction circuit is spread slowly by adjusting parameters of the first resistor and the first capacitor.

* * * * *